Feb. 17, 1931.  C. H. MASON  1,792,996
CHAIN
Filed Aug. 3, 1929
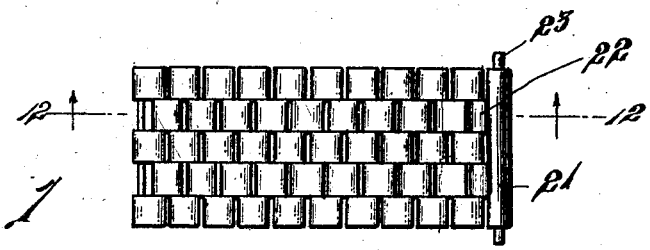
Fig. 1
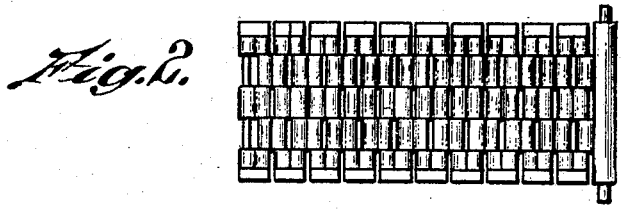
Fig. 2
Fig. 3 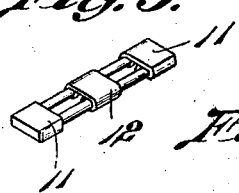 Fig. 4 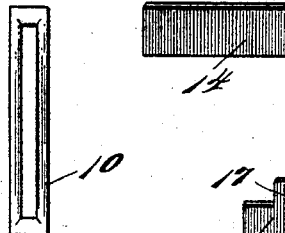 Fig. 5 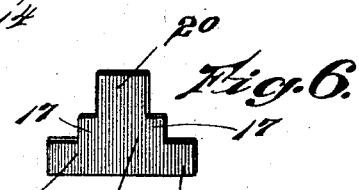
Fig. 7 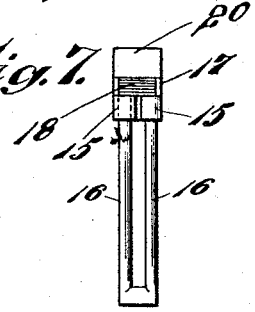 Fig. 6
Fig. 8 Fig. 9 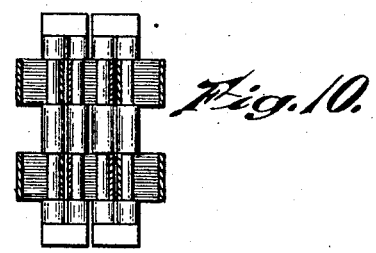 Fig. 10
Fig. 11
Fig. 12
INVENTOR.
Charles H. Mason
BY
Barlow & Barlow
ATTORNEYS.

Patented Feb. 17, 1931

1,792,996

UNITED STATES PATENT OFFICE

CHARLES H. MASON, OF EDGEWOOD, RHODE ISLAND, ASSIGNOR TO PIONEER WATCH CASE COMPANY, A COPARTNERSHIP COMPOSED OF HERBERT I. KOLLBERG, OF MOUNT VERNON, NEW YORK, AND CHARLES H. MASON, OF EDGEWOOD, RHODE ISLAND

CHAIN

Application filed August 3, 1929. Serial No. 383,378.

My present invention relates to flexible chains, and has particular reference to chains for use as bracelets, watch straps, and the like.

One object of my invention is to construct a chain of any desired width without the use of solder.

Another object is to simplify the construction of a chain having staggered, parallel sections pivotally connected together.

An additional object is to form the sections of sheet metal, which are adapted for multiple operations or quantities.

A further object is to form a chain or flat sheet metal sections, the sections connecting devices being concealed from view.

Other objects and advantageous features will be readily apparent from the detailed description following, in connection with the accompanying drawings, and will be particularly pointed out in the appended claims.

In the drawings:

Fig. 1 is a plan view of the novel chain;

Fig. 2 is a view of the under side thereof;

Fig. 3 is a perspective view of a link element;

Figs. 4, 5 and 6 are views of the component parts of a link element;

Figs. 7, 8 and 9 show the progressive assembly of the link element;

Fig. 10 is a bottom view of the links assembled with the connecting links therein in section;

Fig. 11 is a view, partly in section, showing the positioning of the pivot sections; and Fig. 12 is a section on the line 12—12 of Fig. 1.

In the construction of jewelry chains having staggered parallel links, it has been found of advantage to avoid the use of pivot wires and solder or the like to reduce the expense and the time required, and I have accomplished this by utilizing links about which spaced sheet metal sections are fixed and secured by folding, and by connecting the links by folding additional sheet metal sections over adjacent links, in the spaces between the fixed sections to hinge them together; and the following is a detailed description of one construction which embodies the principles of my invention.

Referring to the drawings:

A plurality of body links 10, having connecting sides 16 secured together by an end bar 18, are each provided with end sections 11 and an intermediate section 12, spaced from the end sections, by rolling the end portions of sheet metal blanks 13 and 14 therearound to form eyes. As will be noted from Fig. 7, the blank 13 has two lateral portions 15 which are rolled over the sides 16 of the link, and edge portions 17 which are turned upwardly alongside the end 18 of the link, the back portion 20 being then folded over to contact with the edge portions 17 and they completely enclose the end of the link. After the end sections have been secured, the blank 14 is then positioned intermediate the end sections and secured by rolling the edges thereof into eyes around the sides 16 of the link.

Adjacent link members are now joined by positioning additional blanks 14 between the intermediate section and the end sections, the edges of these blanks being rolled over the adjacent sides 16 of adjacent links. The sides 16 are rounded to permit of extreme flexibility at the hinging connection of the links.

A tip 21 is secured to the end of the chain, to finish the same, by means of extensions 22 which are of the same width as the blanks 14 rolled over the sides 16 of the end link, between the intermediate and end sections. The tip has resiliently mounted trunnions 23 extending from each end thereof for attachment to a watch.

The improved construction provides a chain having pivotally connected staggered parallel links which are secured together without solder, the use of sheet metal providing a thin construction, as shown in Figs. 10 and 12, presenting a pleasing, attractive appearance with the link framework completely concealed.

While I have described one specific form of chain embodying the features of my invention, it is obvious that desired changes in form and arrangement may be made, within the scope of the invention as defined in the appended claims.

I claim:

1. A flexible chain for a bracelet or the like, comprising a plurality of seamless rectangularly shaped link members, end sections and intermediate sections separate from said link members and secured to said link members in spaced relation, and additional sections positioned in the spaces between said first sections and hingedly connected to adjacent link members.

2. A flexible chain for a bracelet or the like, comprising a plurality of link members, end sections and intermediate sections spaced from said end sections secured to said link members by rolling the edges thereof over the sides of said link members, and additional sections positioned in the spaces between said first sections and hingedly connected to adjacent link members.

3. A flexible chain for a bracelet or the like, comprising a plurality of link members, end sections and intermediate sections spaced from said end sections secured to said link members by rolling the edges thereof over the sides of said link members, the end sections having portions covering the ends of said link members, and additional sections positioned in the spaces between said first sections and hingedly connected to adjacent link members.

4. A flexible chain for a bracelet or the like, comprising a plurality of rectangular link members, sheet metal end sections secured to the ends of said members by rolling the edges thereof over the sides of said link members, intermediate sheet metal sections secured to said members by rolling the edges thereof over the sides of said link members, said sections being spaced apart, and additional sheet metal sections positioned in the spaces between said link members and pivotally connected to the sides of adjacent link members by rolling the edges thereof over the sides of said link members.

5. A flexible chain for a bracelet or the like, comprising a plurality of rectangular link members, sheet metal end sections secured to the ends of said members by rolling the edges thereof over the sides of said link members, the end sections having portions covering the ends of said link members, intermediate sheet metal sections secured to said members, said sections being spaced apart, and additional sheet metal sections positioned in the spaces between said link members and pivotally connected to the sides of adjacent link members.

6. In a chain for bracelets or the like, a link having sides and ends joining the sides, sections secured to each end comprising face portions contacting the end and part of the sides, lateral portions rolled over the sides, edge portions extending alongside the end, and a back portion extending over the end and meeting the edge portions, whereby the ends of said link are completely housed by said sections.

7. In a chain for bracelets or the like, a link having sides and ends joining the sides, sections secured to each end comprising face portions contacting the end and part of the sides, lateral portions rolled over the sides, edge portions extending alongside the end, and a back portion extending over the end and meeting the edge portions, whereby the ends of said link are completely housed by said sections, and an intermediate section comprising a face portion contacting the sides and lateral portions rolled over the sides, said intermediate section being spaced from the end sections.

8. In a chain, a plurality of rows of parallel sections, the sections in adjacent rows being staggered, each section having a portion folded to form an integral eye at each end thereof longitudinally of the chain, said eyes aligning transversely of the chain, connecting members extending transversely through said eyes, and bars joining adjacent connecting members and integral therewith.

9. In a chain, a plurality of rows of parallel sections, the sections in adjacent rows being staggered, each section having a portion folded to form an integral eye at each end thereof longitudinally of the chain, said eyes aligning transversely of the chain, connecting members extending transversely through said eyes, and bars joining adjacent connecting members, and integral therewith, the end sections having portions folded over the edges of the said bars.

In testimony whereof I affix my signature.

CHARLES H. MASON.